US010294122B2

(12) United States Patent

Ohkawara et al.

(10) Patent No.: US 10,294,122 B2

(45) Date of Patent: May 21, 2019

(54) SEAWATER DESALINATION DEVICE AND SEAWATER DESALINATION METHOD

(71) Applicants: OHKAWARA KAKOHKI CO., LTD., Kanagawa (JP); THE UNIVERSITY OF TOKYO, Tokyo (JP)

(72) Inventors: Masaaki Ohkawara, Kanagawa (JP); Gentaro Nemoto, Kanagawa (JP); Yasuki Kansha, Tokyo (JP); Atsushi Tsutsumi, Tokyo (JP); Masanori Ishizuka, Tokyo (JP); Hiroyuki Mizuno, Tokyo (JP)

(73) Assignee: OHKAWARA KAKOHKI CO., LTD. (JP)

(*) Notice: Subject to any disclaimer, the term of this patent is extended or adjusted under 35 U.S.C. 154(b) by 444 days.

(21) Appl. No.: 14/960,152

(22) Filed: Dec. 4, 2015

(65) Prior Publication Data

US 2016/0083266 A1 Mar. 24, 2016

Related U.S. Application Data

(63) Continuation of application No. PCT/JP2014/065006, filed on Jun. 5, 2014.

(30) Foreign Application Priority Data

Jun. 5, 2013 (JP) ................................ 2013-119332

(51) Int. Cl.

*C02F 1/04* (2006.01)
*B01D 1/14* (2006.01)

(Continued)

(52) U.S. Cl.

CPC ................ *C02F 1/041* (2013.01); *B01D 1/14* (2013.01); *B01D 1/28* (2013.01); *B01D 1/2887* (2013.01);

(Continued)

(58) Field of Classification Search

CPC .. C02F 1/041; B01D 1/14; B01D 1/28; B01D 1/2887; B01D 1/305

See application file for complete search history.

(56) References Cited

U.S. PATENT DOCUMENTS 3,245,883 A 12/1966 Loebel
3,956,072 A * 5/1976 Huse ..................... B01D 1/289 159/24.1

(Continued)

FOREIGN PATENT DOCUMENTS

DE 2928392 A1 1/1981
DE 4036345 A1 5/1992

(Continued)

OTHER PUBLICATIONS

PCT/JP2014/065006 International Search Report dated Aug. 5, 2014; 2pgs.

(Continued)

*Primary Examiner* — Jonathan Miller

(74) *Attorney, Agent, or Firm* — Bracewell LLP; Brad Y. Chin

(57) ABSTRACT

Embodiments of the invention provide a seawater desalination device, including a steam re-compressor configured to pressurize steam by pressurizing a steam; a first heat exchanger configured to exchange an amount of sensible heat of seawater to be desalinated with an amount of liquid sensible heat after pressurized steam is condensed, and an amount of sensible heat of a concentrated liquid after seawater is concentrated; a second heat exchanger configured to exchange an amount of heat of pressurized steam, an amount of latent heat of vaporization of seawater, and an amount of sensible heat when seawater is evaporated, and configured to concentrate seawater; a seawater supply means; a steam supply means; a first discharge means; a (Continued)

second discharge means; and a water-droplet separation means.

8 Claims, 1 Drawing Sheet

(51) Int. Cl.
*B01D 1/28* (2006.01)
*B01D 1/30* (2006.01)
*C02F 103/08* (2006.01)

(52) U.S. Cl.
CPC .......... *B01D 1/305* (2013.01); *C02F 2103/08* (2013.01); *C02F 2303/10* (2013.01); *Y02A 20/128* (2018.01); *Y02P 70/34* (2015.11)

(56) References Cited

U.S. PATENT DOCUMENTS 4,168,211 A * 9/1979 Pottharst, Jr. ............ B01D 1/10 159/14
4,350,570 A 9/1982 Maisotsenko et al.
4,341,601 A 11/1982 Hartig
4,424,098 A 1/1984 Hartig
4,869,067 A * 9/1989 Sears ..................... B01D 1/221 165/138
5,587,054 A * 12/1996 Keith ................... B01D 1/2856 159/24.1
5,597,453 A * 1/1997 Sears ..................... B01D 1/221 159/24.1
5,968,321 A * 10/1999 Sears ..................... B01D 1/221 202/172
6,833,056 B1 12/2004 Kamiya et al.
9,205,347 B2 * 12/2015 Batty ................... B01D 1/2818
2015/0360971 A1 * 12/2015 Schleiffarth ............ C02F 1/048 202/176

FOREIGN PATENT DOCUMENTS

EP 1798202 A1 6/2007
JP S46-024241 B1 7/1971
JP S51-024579 A 2/1976
JP S56-501115 A 8/1981
JP S56-130289 A 10/1981
JP S59-55303 A 3/1984
JP S59-105835 A 6/1984
JP 2001-526959 A 12/2001
JP 2010-36056 A 2/2010
JP 2010-36057 A 2/2010
JP 2012-239956 A 5/2012
WO 0225201 A1 3/2002
WO 2010026953 A1 3/2010

OTHER PUBLICATIONS

EP14807801.7 European Search Report dated Oct. 6, 2016; 15pgs.
JP2015-521493 Office Action dated Mar. 30, 2018; 8pgs.
EP14807801.7 Office Action dated Feb. 13, 2018; 5pgs.
JP2015-521493 Final Office Action dated Aug. 22, 2018; 10 pgs.

* cited by examiner

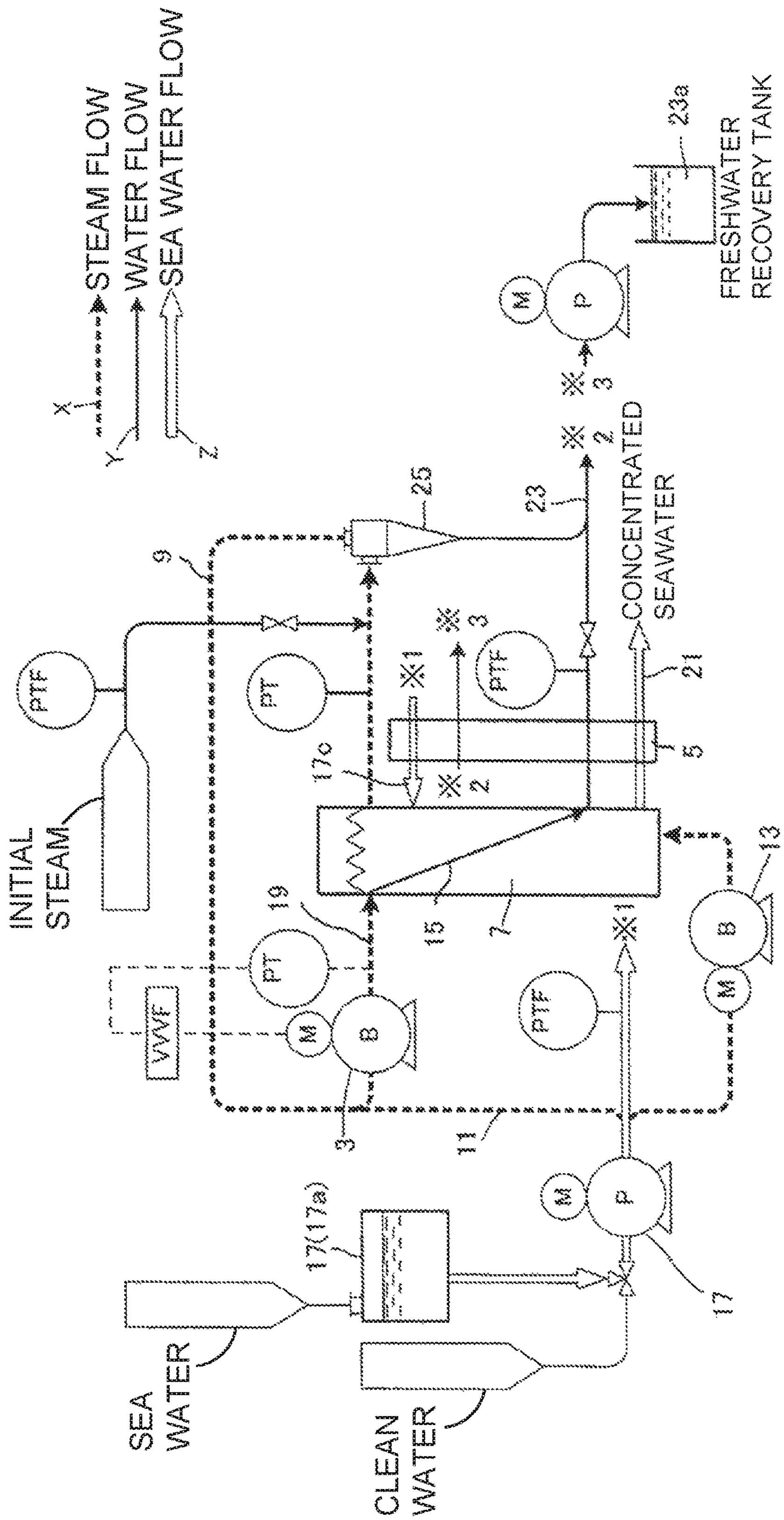
STEAM FLOW
WATER FLOW
SEA WATER FLOW
X
Y
Z
1
INITIAL STEAM
PTF
PT
VVVF
M
B
3
9
11
19
15
7
17c
※1
※2
※3
5
21
PTF
25
23
CONCENTRATED SEAWATER
13
SEA WATER
17(17a)
CLEAN WATER
P
17
FRESHWATER RECOVERY TANK
23a

SEAWATER DESALINATION DEVICE AND SEAWATER DESALINATION METHOD

CROSS REFERENCE TO RELATED APPLICATIONS

This application claims the benefit of and priority under 35 U.S.C. § 119 to PCT Patent Application No. PCT/JP2014/0605006, entitled, "SEAWATER DESALINATION DEVICE AND SEAWATER DESALINATION METHOD," filed on Jun. 5, 2014, which claims priority to Japanese Patent Application No. JP 2013-119332, entitled, "SEAWATER DESALINATION DEVICE AND SEAWATER DESALINATION METHOD," filed on Jun. 5, 2013, which are hereby incorporated by reference in their entirety into this application.

BACKGROUND

Field of the Invention

The present invention relates to seawater desalination devices and seawater desalination methods based on an evaporation method. In particular, the present invention relates to a seawater desalination device and a seawater desalination method based on an evaporation method, which are effective for stable water supply without causing water shortage issues. In addition, the present invention relates to a seawater desalination device and a seawater desalination method based on an evaporation method, which are suitable for salt production.

Description of the Related Art

An evaporation method and a membrane method are available for seawater desalination.

Such an "evaporation method" includes a multi-stage flash method and a multiple effect method. On the other hand, such a "membrane method" includes a reverse osmosis membrane method and an electrodialysis method.

When desalinating seawater using such an "evaporation method" described above, water can be obtained with an advantageously lowered salinity concentration. However, a large amount of energy is disadvantageously required throughout a desalination process of the method. In addition, when seawater is concentrated to a high level for desalination through the "evaporation method" described above, some phenomena including scaling can occur in a device and other equipment, resulting in some problems including lowered thermal efficiency.

Such scaling and other phenomena occurred through a process of an evaporation method further can cause sulfate and carbonate to be extracted from scaling components such as calcium and magnesium in seawater due to concentration and raised water temperature, and to be adhered onto a surface of a heat transfer pipe. Because of this, thermal transfer efficiency is disadvantageously lowered, thus an amount of produced water is reduced. (Issued in Special edition/The basics and applications of water treatment technologies/The latest trends of seawater desalination, *Chemical Devices*, vol. 51(8), pp. 25-30, 2009-08-00 Kogyo Chosakai Publishing Co., Ltd.)

Advantageously, desalinating seawater based on the "membrane method" described above consumes less energy, when compared with the evaporation method described above. However, any pretreatments including sterilization and removal of adhering matters are required. In addition, because the obtained water has a high level of salinity concentration, the water can neither be used for industrial water nor city water.

JP-A-2010-36056 describes a "heating module" that includes a "first heat exchanger" for exchanging heat between an input fluid and an output fluid; a "first compressor" for compressing and heating either of the input fluid or the output fluid; and an expansion machine for expanding and cooling the input fluid. The "heating module" described in JP-A-2010-36056 has an object to increase an energy saving effect.

JP-A-2010-36057 describes a "separation process module" that includes a "separator" for separating an input fluid that includes a first component and a second component into a first output fluid that includes the first component and a second output fluid that includes the second component; and a "first compressor" for compressing and heating the first output fluid output from the separator. In addition, the "separation process module" described above includes a first heat exchanger, a second heat exchanger, and a third heat exchanger. The "separation process module" described in JP-A-2010-36057 has an object to increase an energy saving effect.

The modules described in the aforementioned conventional art can be appreciated in the view point of increasing energy efficiency. However, the modules are not suited for seawater desalination. For example, the modules described in the aforementioned conventional art are difficult to recover and treat obtained "liquids" such as a desalinated liquid and extracted "solids" such as salt both obtained when desalinating seawater.

In addition, because the modules described in the aforementioned conventional art are difficult to recover and treat obtained "liquids" such as a desalinated liquid and extracted "solids" such as salt, these modules are also difficult to solve problems including a reduced amount of produced water due to lowered thermal transfer efficiency caused by sulfate and carbonate extracted from calcium and magnesium through concentration and raised water temperature and adhered onto a surface of a heat transfer pipe.

Embodiments of the invention have been made in view of solving the above-mentioned problems, and therefore provide a seawater desalination device and a seawater desalination method based on an evaporation method, which can reduce, by using an self-heat recuperation process, an amount of necessary energy in half or less, compared with a conventional multi-stage flash method. Particularly, embodiments of the invention are aimed to provide a seawater desalination device and a seawater desalination method based on an evaporation method through which, by using a three-phase fluidized bed, a high thermal efficiency operation is possible even at a high salinity concentration level, while preventing scaling to a heat-transmitting surface.

SUMMARY

Embodiments of the invention provide a seawater desalination device and a seawater desalination method.

According to at least one embodiment, there is provided a seawater desalination device for seawater desalination. The device includes a steam re-compressor configured to generate pressurized steam by pressurizing a steam, and a first heat exchanger configured to exchange an amount of liquid sensible heat of seawater to be desalinated with an amount of liquid sensible heat after the pressurized steam is condensed, and an amount of sensible heat of a concentrated liquid after the seawater is concentrated. The device further includes a second heat exchanger configured to exchange an amount of heat of the pressurized steam, latent heat of vaporization of the seawater, and an amount of steam sensible heat when the seawater is evaporated, and further configured to concentrate the seawater, and a seawater supplier configured to supply the seawater to the first heat exchanger, and further to supply the seawater from the first heat exchanger to the second heat exchanger. Further, the device includes a steam supplier configured to supply steam evaporated from the seawater to the second heat exchanger, and a first discharger configured to discharge externally either of the concentrated seawater liquid after the seawater is concentrated or salt extracted from the seawater, or both of the concentrated seawater liquid and the salt. The device further includes a second discharger configured to discharge externally freshwater separated from the seawater, and a water-droplet separator configured to separate droplets of water mixed into the steam evaporated from the seawater and discharged from the second heat exchanger.

According to at least one embodiment, the steam re-compressor is further configured to re-compress the steam to increase an amount of heat.

According to at least one embodiment, all of the amount of heat necessary for seawater desalination is fully generated by the steam re-compressor.

According to at least one embodiment, the second heat exchanger is a three-phase fluidized bed.

According to at least one embodiment, the second heat exchanger comprises a heat transfer region for desalinating the seawater, the heat transfer region having an adjustable-formed heat transfer area.

According to at least one embodiment, the device further includes a steam circulator, the steam circulator comprising a circulation line configured to circulate steam into a channel in the second heat exchanger.

According to another embodiment of the invention, there is provided a seawater desalination method for seawater desalination. The method includes generating pressurized steam by pressurizing a steam, exchanging, in a first heat-exchange step, an amount of a liquid sensible heat of seawater to be desalinated with an amount of liquid sensible heat after the pressurized steam is condensed, and an amount of sensible heat of a concentrated liquid after the seawater is concentrated, and exchanging, in a second heat-exchange step, an amount of heat of the pressurized steam, an amount of latent heat of vaporization of the seawater, and an amount of steam sensible heat when the seawater is evaporated, and concentrating the seawater. The method further includes supplying the seawater to the first heat-exchange step, and further supplying the seawater from the first heat-exchange step to the second heat-exchange step. Further, the method includes supplying steam evaporated from the seawater to the second heat-exchange step, and discharging, in a first discharge step, externally either of the concentrated seawater liquid after the seawater is concentrated or salt extracted from the seawater, or both of the concentrated seawater liquid and the salt. The method further includes separating droplets of water mixed into the steam evaporated from the seawater and discharged from the second heat-exchange step.

According to at least one embodiment, the method further includes circulating steam into the second heat-exchange step.

According to another embodiment of the invention, there is provided a device including a steam re-compressor configured to generate pressurized steam by pressurizing a steam, a first heat exchanger configured to exchange an amount of liquid sensible heat of seawater to be desalinated with an amount of liquid sensible heat after the pressurized steam is condensed, and an amount of sensible heat of a concentrated liquid after the seawater is concentrated, and a second heat exchanger configured to exchange an amount of heat of the pressurized steam, latent heat of vaporization of the seawater, and an amount of steam sensible heat when the seawater is evaporated, and further configured to concentrate the seawater. The device further includes a seawater means for supplying the seawater to the first heat exchanger, and further for supplying the seawater from the first heat exchanger to the second heat exchanger, and a steam supply means for supplying steam evaporated from the seawater to the second heat exchanger. Further, the device includes a first discharging means for discharging externally either of the concentrated seawater liquid after the seawater is concentrated or salt extracted from the seawater, or both of the concentrated seawater liquid and the salt, a second discharging means for discharging externally freshwater separated from the seawater, and a water-droplet separation means for separating droplets of water mixed into the steam evaporated from the seawater and discharged from the second heat exchanger.

With a seawater desalination device and a seawater desalination method based on an evaporation method according to various embodiments of the invention, an amount of necessary energy can be reduced in half or less, compared with a consumption energy necessary through a conventional multi-stage flash method. Particularly, by using a three-phase fluidized bed, a high thermal efficiency operation is possible even in a high salinity concentration level, while preventing scaling to a heat-transmitting surface.

BRIEF DESCRIPTION OF DRAWINGS

These and other features, aspects, and advantages of the invention are better understood with regard to the following Detailed Description, appended Claims, and accompanying FIGURE. It is to be noted, however, that the FIGURE illustrates only various embodiments of the invention and are therefore not to be considered limiting of the invention's scope as it may include other effective embodiments as well.

FIG. 1 is a schematic view of a seawater desalination device according to an embodiment of the invention.

DETAILED DESCRIPTION

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing FIGURE illustrates the general manner of construction, and descriptions and details of well-known features and techniques may be omitted to avoid unnecessarily obscuring the discussion of the described embodiments of the invention. Additionally, elements in the drawing FIGURE is not necessarily drawn to scale. For example, the dimensions of some of the elements in the FIGURE may be exaggerated relative to other elements to help improve understanding of embodiments of the present invention. Like reference numerals refer to like elements throughout the specification.

Hereinafter, a seawater desalination device according to various embodiments of the invention will now be specifically described herein. However, embodiments of the invention broadly include any seawater desalination devices that include the matters used to specify the present invention, and the present invention is not limited to the embodiments described below.

According to at least one embodiment, there is provided a seawater desalination device for seawater desalination, which is mainly configured with a steam re-compressor, a first heat exchanger, a second heat exchanger, a seawater supplier or supply means, a steam supplier or supply means, a first discharger or discharge means, a second discharger or discharge means, and a water-droplet separator or separation means. The "steam re-compressor" described above is capable of generating pressurized steam by pressurizing a steam. The "first heat exchanger" described above is capable of exchanging an amount of liquid sensible heat of seawater to be desalinated with an amount of sensible heat of a liquid after pressurized steam is condensed, and an amount of sensible heat of a concentrated liquid after seawater is concentrated. The "second heat exchanger" described above is capable of exchanging an amount of heat of pressurized steam, an amount of latent heat of vaporization of seawater, and an amount of steam sensible heat when seawater is evaporated, as well as is capable of concentrating seawater. The "seawater supplier" or "seawater supply means" described above is an element or means that supplies seawater to the first heat exchanger, and supplies seawater from the first heat exchanger to the second heat exchanger. The "steam supplier" or "sweater supply means" described above is an element or means that supplies steam evaporated from seawater to the second heat exchanger. The "first discharger" or "first discharge means" described above is an element or means that discharges externally either of a concentrated seawater liquid after seawater is concentrated or salt extracted from seawater, or both of concentrated seawater liquid and salt. The "second discharger" or "second discharge means" described above is an element or means that discharges externally freshwater separated from seawater. The "water-droplet separator" or "water-droplet separation means" described above is an element or means that separates droplets of water mixed into steam evaporated from seawater and discharged from the second heat exchanger.

[1-1] Steam re-compressor: A steam re-compressor (compressor) according to at least one embodiment of the invention generates pressurized steam by pressurizing a steam. That is, the steam re-compressor is used to re-compress steam supplied into a channel in a seawater desalination device. Such a steam re-compressor includes, for example, a compressor and a steam compressing blower. However, the present invention is not limited to such a configuration.

According to at least one embodiment, steam generated in a process for evaporating a raw liquid, i.e., seawater, is compressed and pressurized by the steam re-compressor. Additionally, instead of steam generated in a process for evaporating a raw liquid, i.e., seawater, steam introduced into a seawater desalination device may be used. However, it is still preferable that steam generated in a process for evaporating a raw liquid, i.e., seawater, is used in a process. However, it is preferable that more steam generated in a process for evaporating a raw liquid, i.e., seawater, described above is contained, because the more the steam generated in a process for evaporating a raw liquid, i.e., seawater, is contained, the more the energy efficiency increases.

In addition, it is preferable that the "steam re-compressor" described above is capable of re-compressing of "the steam" described above to increase an amount of heat. This is for increasing energy efficiency by using steam re-compressor to increase the pressurized steam by an amount of heat exchange temperature difference, and to exchange the amount of increased heat with the amount of heat of seawater to be desalinated in seawater desalination devices.

In addition, it is preferable that all amount of heat necessary for seawater desalination is fully generated by the steam re-compressor described above. By configuring a device in such a manner, energy efficiency can be increased to a maximum.

Furthermore, in order to efficiently desalinate seawater, it is preferable that a channel in a seawater desalination device is excessively heated before desalinating seawater. However, when such a channel in a seawater desalination device is excessively heated before desalinating seawater, an amount of heat through excessive-heating of the channel in the seawater desalination device is not included in all amount of heat necessary for seawater desalination using the "steam re-compressor" described above.

The "steam re-compressor" described above includes, for example, a compressor and a steam compressing blower, but is not limited thereto. For example, by using a steam-compatible compressor (steam compressor), fluctuations of pressure and other factors occurred when controlling such a compressor with an inverter can finely be followed-up. In addition, energy efficiency can be increased throughout a seawater desalination process using a steam compressor based on an self-heat recuperation technology.

[1-2] Heat exchanger: A "heat exchanger" according to at least one embodiment of the invention is configured with a first heat exchanger and a second heat exchanger. The "heat exchanger" is capable of exchanging amount of heat of pressurized steam and seawater to be desalinated. That is, the "heat exchanger" described above is arranged for exchanging "amount of heat of pressurized steam" and amount of heat of "seawater to be desalinated" in each stage in a channel from "supplying a raw liquid, i.e., seawater," to a seawater desalination device to discharging either of a "concentrated seawater liquid after seawater is concentrated" or "salt extracted from seawater," or "both of concentrated seawater liquid and salt," and a "liquid after pressurized steam is condensed" from the seawater desalination device.

[1-2-1] First heat exchanger: A "first heat exchanger" according to at least one embodiment of the invention is configured to exchange amount of liquid sensible heat of seawater to be desalinated with both of amount of liquid sensible heat after pressurized steam is condensed and an amount of sensible heat of a concentrated liquid after seawater is concentrated. That is, the first heat exchanger is arranged to exchange amount of sensible heat between "seawater to be desalinated," a "liquid after pressurized steam is condensed," and a "concentrated seawater liquid after seawater is concentrated, and deposition" in each stage in a channel from "supplying seawater to be desalinated" into a seawater desalination device to discharging either of a "concentrated seawater liquid after seawater is concentrated" or "salt extracted from seawater," or in a channel to discharging "both of concentrated seawater liquid and salt," and a "liquid after pressurized steam is condensed" from the seawater desalination device.

By configuring the "first heat exchanger" as described above, in conjunction with a "second heat exchanger" described later, generated heat (amount of heat) can fully be exchanged in a process from concentrating seawater to be desalinated to discharging externally either of a "concentrated seawater liquid after seawater is concentrated" or "salt extracted from seawater," or "both of concentrated seawater liquid and salt." Accordingly, a high efficiency heat exchange can be achieved. In addition, exchanging generated heat (amount of heat) fully in a process from concentrating seawater to be desalinated to discharging externally either of a "concentrated seawater liquid after seawater is concentrated" or "salt extracted from seawater," or "both of concentrated seawater liquid and salt" can provide a necessary energy for heat exchange, which is equivalent to a temperature difference, by driving a steam compressor only. Accordingly, a seawater desalination device according to at least one embodiment of the invention requires no heating operation at all.

Furthermore, the "first heat exchanger" is described as a single device in FIG. 1. However, a plurality of separate heat exchangers may be used for exchanging amount of liquid sensible heat of seawater to be desalinated with amount of sensible heat of a liquid after pressurized steam is condensed and amount of sensible heat of a concentrated liquid after seawater is concentrated.

[1-2-2] Second heat exchanger: A "second heat exchanger" according to at least one embodiment of the invention is capable of exchanging amount of heat of pressurized steam, amount of latent heat of vaporization of seawater, and amount of steam sensible heat when seawater is evaporated, as well as capable of concentrating the seawater. By configuring the "second heat exchanger" as described above, in conjunction with the "first heat exchanger" described above, generated heat (amount of heat) can fully be exchanged in a process from concentrating seawater to be desalinated to discharging externally either of a "concentrated seawater liquid after seawater is concentrated" or "salt extracted from seawater," or "both of concentrated seawater liquid and salt." Accordingly, a high efficiency heat exchange can be achieved. In addition, exchanging generated heat (amount of heat) fully in a process from concentrating seawater to be desalinated to discharging externally either of a "concentrated seawater liquid after seawater is concentrated" or "salt extracted from seawater," or "both of concentrated seawater liquid and salt," and a "liquid after pressurized steam is condensed" can provide a necessary energy for heat exchange, which is equivalent to a temperature difference, by driving a steam compressor only. Accordingly, a seawater desalination device according to at least one embodiment of the invention requires no heating operation at all.

For example, as shown in FIG. 1, a "seawater desalination device 1" that is configured to store a "raw liquid," i.e., "seawater," in a "raw liquid tank 17*a*" that configures a seawater supply means 17, and to deliver a predetermined amount of a "raw liquid," i.e., "seawater," to a "first heat exchanger 5" with a pump P will now be described herein. The "seawater desalination device 1" described above is configured to further deliver "seawater" heated in the "first heat exchanger 5" described above to a "second heat exchanger 7" via a "seawater supply pipe 17*c*" that configures the seawater supply means 17. In addition, the "second heat exchanger 7" is coupled to a first discharge pipe, i.e., a "first discharge means 21," for discharging externally either of a "concentrated seawater liquid after seawater is concentrated" or "salt extracted from seawater," or "both of concentrated seawater liquid and salt." In addition, the "second heat exchanger 7" is coupled to "second discharge means 23" for externally discharging freshwater separated from seawater, including a second discharge pipe 23*a*.

A plate type heat exchanger, for example, may be used as the "second heat exchanger" described above according to at least one embodiment of the invention. In such a plate type heat exchanger, a heat transfer area can be easily changed by changing the number of plates, which is desirable when it is necessary to change a heat transfer area in response to an operating condition.

A three-phase fluidized bed is desirable for the "second heat exchanger" described above. Such a three-phase fluidized bed is a fluidized bed in which a solid phase (a moving med-ium such as glass beads or deposition), a gas phase (steam), and a liquid phase (seawater) move. The three-phase fluidized bed used as the "second heat exchanger" described above can effectively exchange amount of heat of pressurized steam, amount of latent heat of vaporization of seawater, and amount of steam sensible heat when seawater is evaporated so as to securely desalinate seawater and extract salt. In addition, by allowing gas to flow inside the "three-phase fluidized bed" when concentrating seawater in the three-phase fluidized bed, a heat exchange surface can be kept clean, and thermal efficiency can be stably prevented from being lowered due to scaling to the heat exchange surface, even in a condition where seawater is concentrated at a high level.

The "three-phase fluidized bed" described above is formed in a cylinder and arranged so that an axis direction of the cylinder is vertical. By forming the "three-phase fluidized bed" in a cylinder, amount of heat of pressurized steam, amount of latent heat of vaporization of seawater to be concentrated, and amount of sensible heat of steam evaporated from seawater are fully exchanged inside the "three-phase fluidized bed" without causing non-uniformity of temperature. That is, seawater can be stably desalinated.

The "three-phase fluidized bed" described above consists of a metal. Non-uniformity of temperature rarely occurs in a metallic bed. Accordingly, temperature increase and temperature decrease can be easily controlled and the process can be done in a short period of time. In addition, thermal efficiency can be increased, while reducing a running cost. However, embodiments of the invention are not limited to such a configuration.

For the metal described above, SUS304, SUS316(L), SUS310S, titanium, Hastelloy™, Inconel™, and Incoloy™ can be used. These metals are superior to heat and corrosion resisting properties.

Furthermore, in addition to the "three-phase fluidized bed" described above, it is preferable that each "seawater desalination device" is configured and formed with salt resistance materials. In addition to selecting a metal having corrosion resisting properties, it is desirable that a surface treatment such as plating and coating is applied for increasing corrosion resisting properties.

For a range of fluid velocity of pressurized steam to be fed from the "steam re-compressor 3" described above into the "three-phase fluidized bed 7" described above, 1 to 20 m/s is acceptable, 3 to 15 m/s is better, and 5 to 10 m/s is the best. By feeding pressurized steam in a predetermined fluid velocity range described above, supplied seawater can be heated in the "three-phase fluidized bed 7" described above to facilitate evaporation of seawater. Therefore, amount of heat of pressurized steam, amount of latent heat of vaporization of seawater, and amount of sensible heat of steam evaporated from seawater can be effectively exchanged.

Accordingly, energy loss is low and seawater desalination, seawater concentration, and salt extraction can be easily done.

On the other hand, if a fluid velocity of pressurized steam fed from the "steam re-compressor 3" described above into the "three-phase fluidized bed 7" described above is below 1 m/s, heat exchange efficiency is sacrificed. In addition, if a fluid velocity of pressurized steam fed from the "steam re-compressor 3" described above into the "three-phase fluidized bed 7" described above exceeds 20 m/s, more power is required for a steam re-compressing device.

For a range of temperature of pressurized steam to be fed from the "steam re-compressor 3" described above into the "three-phase fluidized bed 7" described above, when a steam compressing blower is used for example, 110 to 130° C. is acceptable, 115 to 125° C. is better, and 117° C. to 123° C. is the best. Additionally, for a range of temperature of pressurized steam, when a steam compressor is used, 130 to 150° C. is acceptable, 135 to 145° C. is better, and 137 to 143° C. is the best. By feeding pressurized steam in a predetermined temperature range described above, seawater sprayed into the "three-phase fluidized bed 7" described above can fully be heated to facilitate evaporation of seawater. Therefore, amount of heat of pressurized steam, amount of latent heat of vaporization of seawater, and amount of sensible heat of steam evaporated from seawater can be effectively exchanged. Accordingly, energy loss is low and seawater desalination, seawater concentration, and salt extraction can be easily done.

On the other hand, if a temperature of pressurized steam fed from the "steam re-compressor 3" described above into the "three-phase fluidized bed 7" described above is below 110° C. when a steam compressing blower is used, or below 130° C. when a steam compressor is used, a more heat transfer area is required for heat exchange. In addition, if a temperature of pressurized steam fed from the "steam re-compressor 3" described above into the "three-phase fluidized bed 7" described above exceeds 130° C. when a steam compressing blower is used, or exceeds 150° C. when a steam compressor is used, power is required excessively for a steam re-compressing device.

For a range of pressure of pressurized steam to be fed into the "steam re-compressor 3" described above into the "three-phase fluidized bed 7" described above, when a steam compressing blower is used for example, 0.14 to 0.27 MPa (absolute pressure) is acceptable, 0.17 to 0.23 MPa (absolute pressure) is better, and 0.18 to 0.21 MPa (absolute pressure) is the best. By feeding pressurized steam in a predetermined pressure range described above, seawater supplied into the "three-phase fluidized bed 7" described above can fully be heated to facilitate evaporation of seawater. Therefore, amount of heat of pressurized steam, amount of latent heat of vaporization of seawater, and amount of sensible heat of steam evaporated from seawater can be effectively exchanged. Accordingly, seawater can be desalinated and concentrated, and salt can be extracted easily.

On the other hand, if a pressure of pressurized steam fed from the "steam re-compressor 3" described above into the "three-phase fluidized bed 7" described above is below 0.14 MPa, amount of heat for necessary to heat-exchange is not obtained. In addition, if a pressure of pressurized steam fed from the "steam re-compressor 3" described above into the "three-phase fluidized bed 7" described above exceeds 0.27 MPa, more power is required for a steam re-compressing device.

In addition, it is preferable that the second heat exchanger includes a heat transfer region for seawater desalination. In addition, it is preferable that a heat transfer area of the "heat transfer region" described above is adjustably formed. The heat transfer region including an adjustable heat transfer area ensures an optimal heat transfer area in response to device power and operating temperatures.

The "heat transfer region" described above can include, for example, a heater and a heat transfer pipe. In addition, the "heat transfer region" described above including an adjustable heat transfer area may be achieved by allowing the heat transfer region to include a configuration having a plurality of heater elements and heat transfer pipes. However, embodiments of the invention are not limited to such a configuration.

The "heat transfer region" described above is arranged at a lower portion of the three-phase fluidized bed. By arranging the heat transfer region at the lower portion of the three-phase fluidized bed, heat can be effectively and transferred to the entire three-phase fluidized bed with an upward flow in the three-phase fluidized bed.

In addition, it is preferable that a steam circulator or circulation means is included, where steam generated in a process for evaporating seawater is used as a fluidized gas in the second heat exchanger. By configuring in such a manner, steam generated in a process for evaporating seawater can be used as a fluidized gas to flow inside the second heat exchanger for increased energy efficiency, at the same time a clean heat exchange surface can be maintained even in a condition where a raw liquid is concentrated at a high level. Therefore, a stable and energy-saving operation can be achieved even in a condition where seawater is concentrated at a high level. It is preferable that a blower having a discharge pressure of at least 5 kPa is used.

In addition, in such a fluidization means, steam generated in a process for evaporating seawater can be used as a fluidized gas for the second heat exchanger by arranging a circulation line in a channel of the second heat exchanger without arranging new other complex equipment.

For the "second heat exchanger" described above, like the "three-phase fluidized bed 7" shown in FIG. 1, a heat exchanger may be used, where a first circulation line 9 and a second circulation line 11 branched from the first circulation line 9 are coupled at an upper end portion, and a compressor 3 (steam re-compressor) is arranged in a channel of the first circulation line 9. Furthermore, a blower is arranged in a channel of the second circulation line 11.

In addition, it is preferable that seawater, media, extracted solids, and other materials are fluidized in a heat exchanging unit. By configuring in such a manner, thermal efficiency can be increased through fluidized seawater, media, extracted solids, and other materials. In addition, by allowing seawater, media, extracted solids, and other materials to flow in the "second heat exchanger," a heat exchange surface portion onto which seawater, media, extracted solids, and other materials come into contact can be prevented from scaling. Further, by allowing seawater, media, extracted solids, and other materials to flow, a clean heat exchange surface can be maintained even in a condition where a raw liquid is concentrated at a high level.

[1-3] Seawater supply means, steam supply means: In addition, the "seawater desalination device" described above includes a seawater supply means that supplies seawater to the first heat exchanger, as well as further supplying seawater from the first heat exchanger to the second heat exchanger. In addition, the "seawater desalination device" described above includes a steam supply means that supplies steam evaporated from seawater to the second heat exchanger. By configuring in such a manner, a raw material, i.e. seawater, and steam can be supplied effectively. Accordingly, seawater can be desalinated and concentrated, salt can be extracted, and other necessary tasks can be carried out.

(Seawater supplier or sweater supply means) The "seawater supplier" or "seawater supply means" described above is configured with various components including, for example, a "raw liquid tank 17_a_" for temporarily storing a "raw liquid," i.e. "seawater," taken from a "seawater suction port," which is also a supply port for a "seawater desalination device"; a pump P for feeding (delivering) seawater into the "seawater desalination device"; and a seawater supply pipe.

However, the present invention is not limited to such a configuration.

(Steam supplier or steam supply means) The "steam supplier" or "steam supply means" described above includes various components, for example, a steam compressing blower, a steam supply pump, and a compressor for steam. With the steam supplier or steam supply means, heat exchange can be done efficiently by supplying steam evaporated from seawater into the second heat exchanger.

[1-4] First discharger or first discharge means, second discharger or second discharge means: The "seawater desalination device" described above includes a first discharger or first discharge means that discharges externally either of a "concentrated seawater liquid after seawater is concentrated" or "salt extracted from seawater," or "both of concentrated seawater liquid and salt." In addition, a second discharger or second discharge means that discharges externally freshwater separated from seawater is included. By configuring in such a manner, the device can discharge externally and effectively not only either of a "concentrated seawater liquid after seawater is concentrated" or "salt extracted from seawater," or "both of concentrated seawater liquid and salt," but also freshwater separated from seawater.

(First discharger or first discharge means) The "first discharger" or "first discharge means" described above may include, for example, a discharge pipe; a tank for storing liquids and solids, including recovered "concentrated seawater liquid," and "salt extracted from seawater"; and a pump. In addition, the "first discharger 21" or "first discharge means 21" described above may discharge externally and separately "concentrated seawater liquid" or "salt extracted from seawater" by arranging another discharge pipe separated from the first discharge pipe.

(Second discharger or second discharge means) The "second discharger" or "second discharge means" described above may be a configuration that includes, for example, a second discharge pipe; a motor and a pump for delivering "freshwater separated from seawater"; and a freshwater recovery tank.

[1-5] Water-droplet separator or water-droplet separation means: In the "seawater desalination device" described above, a "water-droplet separator" or "water-droplet separation means" is arranged for separating droplets of water mixed into steam evaporated from seawater and discharged from the "second heat exchanger" described above. By configuring in such a manner, "droplets of water" mixed into steam evaporated from seawater and discharged from the "second heat exchanger" described above can be effectively separated. Accordingly, by removing "droplets of water" mixed into steam evaporated from seawater, the steam re-compressor can be stably operated with a predetermined capability.

The "water-droplet separator" or "water-droplet separation means" described above may include, for example, a cyclone separator and a mist separator. However, embodiments of the invention are not limited to such components.

In addition, a discharge pipe may be arranged onto the second heat exchanger as a discharge means to discharge extracted salt and other materials. By configuring in such a manner, mainly solid salt can easily and preferably be discharged externally.

(Seawater supply device) The seawater desalination device according to at leaset one embodiment of the invention supplies seawater to the three-phase fluidized bed 7. A raw liquid supply device may include, in addition to a two-fluid nozzle arranged on an upper portion of the three-phase fluidized bed 7, a pressure nozzle and a pressure two-fluid nozzle. Another seawater supply device may include various components such as a dripping type supply pipe, a dripping nozzle, and a liquid delivery pipe for forcibly delivering a liquid into the fluidized bed.

According to another embodiment of the invention, there is provided a seawater desalination method, which is mainly a method of seawater desalination, and includes a pressurized steam generation step, a first heat-exchange step, and a second heat-exchange step, and further includes, a seawater supply step, a steam supply step, a first discharge step, and a water-droplet separation step. The "pressurized steam generation step" described above is a step of generating pressurized steam by pressurizing a steam. The "first heat-exchange step" described above is a step of exchanging an amount of liquid sensible heat of seawater to be desalinated with an amount of liquid sensible heat after pressurized steam is condensed, and an amount of sensible heat of a concentrated liquid after seawater is concentrated. The "second heat-exchange step" described above is a step capable of exchanging an amount of heat of pressurized steam, amount of latent heat of vaporization of seawater, and amount of steam sensible heat when seawater is evaporated, as well as is capable of concentrating seawater. The "seawater supply step" described above is a step of supplying seawater to the first heat-exchange step, and further supplying seawater from the first heat-exchange step to the second heat-exchange step. The "steam supply step" described above is a step of supplying steam evaporated from seawater to the second heat-exchange step. The "first discharge step" described above is a step of discharging externally either of a concentrated seawater liquid after seawater is concentrated or salt extracted from the seawater, or both of concentrated seawater liquid and salt. The "water-droplet separation step" described above is a step of separating droplets of water mixed into steam evaporated from seawater and discharged in the second heat-exchange step.

According to the seawater desalination method described above, seawater can be desalinated through the pressurized steam generation step capable of generating pressurized steam by pressurizing a steam based on an self-heat recuperation technology. In addition, with the seawater desalination method according to the present invention, generated heat (amount of heat) can fully be exchanged in a process from concentrating seawater to be desalinated to discharging externally either of a "concentrated seawater liquid after seawater is concentrated" or "salt extracted from seawater," or "both of concentrated seawater liquid and salt," and a "liquid after pressurized steam is condensed." Accordingly, a high efficiency heat exchange can be achieved. In addition, exchanging generated heat (amount of heat) fully in a process from concentrating seawater to be desalinated to discharging externally either of a "concentrated seawater liquid after seawater is concentrated" or "salt extracted from seawater," or "both of concentrated seawater liquid and salt," and a "liquid after pressurized steam is condensed" can provide a necessary energy for heat exchange, which is equivalent to a temperature difference, by driving a steam compressor only. Accordingly, the seawater desalination method according to at least one embodiment of the invention requires no heating operation at all.

In the "seawater desalination method" described above, it is preferable that "pressurized steam" generated in a process for evaporating a raw liquid, i.e. seawater, is used. Additionally, instead of steam generated in a process for evaporating a raw liquid, i.e., seawater, another steam may be used. However, it is still preferable that at least steam generated in a process for evaporating a raw liquid, i.e., seawater, is used in a process. However, it is preferable that more steam generated in a process for evaporating a raw liquid, i.e., seawater, described above is contained, because the more the steam generated in a process for evaporating a raw liquid, i.e., seawater, is contained, the more the energy efficiency increases.

"Exchanging amount of heat between pressurized steam and seawater to be desalinated" through the seawater desalination method according to the present invention means that generated heat (amount of heat) is fully exchanged in a process from "supplying a raw liquid, i.e., seawater," through concentrating seawater to be desalinated, to discharging externally either of a "concentrated seawater liquid after seawater is concentrated" or "salt extracted from seawater," or "both of concentrated seawater liquid and salt," and a "liquid after pressurized steam is condensed."

In addition, it is preferable that, in the "seawater desalination method" according to at least one embodiment of the invention, a circulation step of circulating either of sensible heat or latent heat, or both of sensible heat and latent heat is included in any of a pressurized steam generation step, a heat-exchange step, and a steam re-compression step to exchange either of sensible heat or latent heat, or both of sensible heat and latent heat. By configuring in such a manner, no complex step is required, and steam generated in a process for evaporating seawater can be used as a fluidized gas for increased energy efficiency. In addition, while responding to change of property of seawater along with seawater desalination, a stable and high energy-saving operation is possible at a high concentration level, compared with conventional methods, as well as scaling is prevented to a heat exchange surface.

Furthermore, with the "seawater desalination method" according to at least one embodiment of the invention, the "seawater desalination device" described herein can be preferably used. In addition, with the "pressurized steam generation step," the "first heat-exchange step," the "second heat-exchange step," the "seawater supply step," the "steam supply step," the "first discharge step," and the "water-droplet separation step" of the "seawater desalination method" according to an embodiment of the invention described above, the "steam re-compressor," the "first heat exchanger," the "second heat exchanger," the "seawater supply means," the "steam supply means," the "first discharge means," the "second discharge means," and the "water-droplet separation means" of the "seawater desalination device" described herein can be preferably used. Accordingly, the matters described in the "seawater desalination device" herein can be applied to the "seawater desalination method" according to at least one embodiment of the invention.

With the "seawater desalination method" according to at least one embodiment of the invention, the "seawater desalination device" described herein can be preferably used. Accordingly, the matters described in the "seawater desalination device" can be applied to the "seawater desalination method" according to at least one embodiment of the invention.

Specific embodiments of a seawater desalination device and a seawater desalination method: A specific aspect of the seawater desalination device and the seawater desalination method according to at least one embodiment of the invention will now be described herein. However, the present invention is not limited to the seawater desalination device and the seawater desalination method which will be described below.

At this point, the seawater desalination device according to an embodiment of the invention may include, as shown in FIG. 1, the seawater desalination device 1. The seawater desalination device 1 includes a compressor 3, a first heat exchanger 5, a seawater supplier or seawater supply means 17, a steam supplier or steam supplier means 19, and a three-phase fluidized bed 7.

In the seawater desalination device 1, as shown in FIG. 1, a raw liquid, i.e., seawater, is supplied into a supply port of the seawater supplier or seawater supply means 17, stored in a "raw liquid tank 17*a*" that configures the seawater supplier or seawater supply means 17, and delivered into the "first heat exchanger 5" through a pump P at a predetermined amount. In the "first heat exchanger 5," heated "seawater" is delivered to the "second heat exchanger 7" via the "seawater supply pipe 17*c*" that configures the seawater supplier or seawater supply means 17. In the "first heat exchanger 5" described above, a raw liquid, i.e. seawater, is heated, and sensible heat is exchanged between the raw liquid, i.e., seawater, produced condensed water (concentrated seawater) or "extracted salt," and a "liquid after pressurized steam is condensed."

In addition, in the seawater desalination device 1 described above, seawater heated in the "first heat exchanger 5" described above is delivered to the "second heat exchanger 7" via the "seawater supply pipe 17*c*" that configures the seawater supply means 17. Particularly, when the "second heat exchanger 7" is a three-phase fluidized bed, "heated seawater" in the "first heat exchanger 5" described above, which is delivered into the "three-phase fluidized bed 7," is evaporated and concentrated with amount of "steam heated in the compressor 3" delivered into the three-phase fluidized bed 7 described above. That is, "moisture (steam)" when seawater is evaporated with amount of steam heated in the compressor 3" is compressed (heated) through an adiabatic compression of the compressor 3.

In addition, in the seawater desalination device 1, part of steam when seawater is evaporated is delivered again into the three-phase fluidized bed 7 by a blower 13 via a second circulation line 11 without passing through the compressor 3.

In addition, in the "seawater desalination device 1," upon a heat transfer pipe is arranged inside the "three-phase fluidized bed 7" described above, heat of steam and water will be fully exchanged in the three-phase fluidized bed 7. That is, steam compressed (heated) in the compressor 3 passes through the heat transfer pipe arranged inside the second heat exchanger 7 for heat exchange with seawater in the second heat exchanger 7. After heat exchanged, steam-condensed water is further delivered into the first heat exchanger 5 for heat exchange with seawater delivered from the seawater supplier or seawater supply means 17 into the first heat exchanger 5, in the first heat exchanger 5. After that, the "water" that is heat-exchanged in the first heat exchanger 5 is discharged externally as "freshwater" from the seawater desalination device 1 via the second discharger or second discharge means 23. In this second discharger or second discharge means 23, a freshwater recovery tank may be arranged for efficient recovery.

In addition, either of a concentrated seawater liquid after seawater is concentrated or salt extracted from seawater, or both of concentrated seawater liquid and salt, is or are discharged externally from the three-phase fluidized bed 7 described above via the first discharge pipe of the first discharger or first discharge means 21. Furthermore, in the first discharger or first discharge means 21, in addition to the first discharge pipe described above, a separate discharge pipe or the like may be arranged to separately discharge externally a "concentrated seawater liquid after seawater is concentrated" and "salt extracted from seawater."

(Excessive-heating process) Furthermore, in order to efficiently desalinate seawater, it is preferable that a channel in a seawater desalination device is excessively heated before desalinating seawater. Because seawater can effectively be desalinated by doing so. In such an excessive-heating process, for example, the channel may be dried after hot water is circulated in the channel. In addition, steam or hot air may be circulated in the channel. In still another example, a heater may be wrapped around externally the device for heating. However, the present invention is not limited to such examples.

Furthermore, a mark X shown in FIG. 1 indicates a steam flow in the "seawater desalination device." Similarly, a mark Y indicates a water flow in the "seawater desalination device." Similarly, a mark Z indicates a seawater flow in the "seawater desalination device." In addition, a mark "M" indicates a motor, while a mark P indicates a "pump."

EXAMPLES

Embodiments of the invention will now be specifically described herein with reference to some practical examples, but the present invention is not limited to these practical examples.

Example 1

As shown in FIG. 1, a seawater desalination device 1 was prepared by arranging a steam re-compressor 3, a first heat exchanger 5, a second heat exchanger 7, a raw liquid supply means, a steam supplier or steam supply means, a first discharger or first discharge means 21, a second discharger or second discharge means 23, and a water-droplet separator or water-droplet separation means 25. A liquid stored in a raw liquid tank was supplied to the first heat exchanger 5 and the second heat exchanger 7 with a liquid delivery pump. On this occasion, the liquid to be delivered was set to a temperature of 25° C. Additionally, seawater was supplied to the first heat exchanger 5 with the liquid delivery pump at 30 kg/h. A raw material was heated to 91° C., at an outlet of the first heat exchanger. Next, steam at an outlet of the second heat exchanger in which latent heat and steam sensible heat would be heat-exchanged was 101° C., 0.1 MPa. And then, steam and a concentrated liquid were separated through the water-droplet separator or water-droplet separation means (separator) 25, and the steam was compressed with the steam re-compressor to 120° C., 0.16 MPa. The pressurized steam was supplied again into the second heat exchanger 7, and heat-exchanged with newly supplied seawater. Additionally, part of steam was separated and used as a fluidized gas in the second heat exchanger 7. For steam supplied from the steam re-compressor 3 to the second heat exchanger 7, steam sensible heat and latent heat were exchanged in the second heat exchanger 7, and a state at the outlet of the second heat exchanger 7 was 110° C. After that, sensible heat was exchanged in the first heat exchanger 5, and freshwater was recovered in a freshwater recovery tank. At first, a heat transfer area of a heat transfer region in the second heat exchanger 7 was not enough, thus heat was not exchanged fully. After that, a desirable heat transfer area was selected for a good operation. As a result, freshwater was obtained as designed at a flow rate of 18 kg/h. An amount of energy of 1.8 kW was required for steam re-compression in this condition.

Comparative Example 1

From a seawater desalination device as shown in FIG. 1, a steam re-compressor 3, a first heat exchanger 5, a second heat exchanger 7, and a steam supplier or steam supply means were removed, while a seawater desalination vessel was prepared. And then, seawater was delivered to the seawater desalination vessel with a liquid delivery pump under a condition where a liquid delivery temperature was 25° C., and a flow rate was 30 kg/h. The same operation with Example 1 was conducted, except a heater was used for heating a liquid, and steam was re-compressed and heat-exchanged, and additionally heat-exchanged. The device was operated under this condition and freshwater was obtained at a flow rate of 18 kg/h. An amount of heat of 13 kW was required for evaporating a raw liquid through a calculation of energy required for the operation.

As a result of Example 1, because an amount of heat required for evaporating a raw material is dramatically smaller than an amount of heat required in Comparative example 1, an energy-saving effect is fully demonstrated. Accordingly, an effect of various embodiments of the invention is supported. Additionally, by changing a heat transfer area, a condition for keeping energy to be consumed in minimum can be selected. On the other hand, Comparative example 1 demonstrates a poor energy saving performance, thus, low thermal efficiency.

Example 2

As shown in FIG. 1, a seawater desalination device was prepared by arranging a steam re-compressor 3, a first heat exchanger 5, a second heat exchanger 7, a raw liquid supplier or raw liquid supply means, a steam supplier or steam supply means, a first discharger or first discharge means 21, a second discharger or second discharge means 23, and a water-droplet separator or water-droplet separation means 25. A saturated NaCl solution stored in a raw liquid tank was supplied into the second heat exchanger with a liquid delivery pump. On this occasion, the liquid to be delivered was set to a temperature of 25° C. The heat exchanger was operated in this state to allow the saturated NaCl solution to flow into the second heat exchanger. As a result, no NaCl was extracted on a surface of the heat exchanger coming into contact with the solution flowing inside the second heat exchanger, even in a state where moisture in the saturated NaCl solution was evaporated and seawater desalination is proceeding.

Comparative Example 2

A seawater desalination device was prepared, where a steam supplier or steam supply means was removed from a seawater desalination device as shown in FIG. 1. A saturated NaCl solution stored in a raw liquid tank was supplied into the second heat exchanger with a liquid delivery pump. On this occasion, the liquid to be delivered was set to a temperature of 25° C. The heat exchanger was operated in this state to allow moisture in the saturated NaCl solution to evaporate in the second heat exchanger. As a result, NaCl was extracted on a surface of the heat exchanger coming into contact with the saturated NaCl solution flowing inside the second heat exchanger, as moisture in the saturated NaCl solution is evaporated.

As a result of Example 2, because the saturated NaCl solution was allowed to flow inside the second heat exchanger 7, no NaCl was extracted on the surface of the heat exchanger, and thermal transfer efficiency is prevented from being lowered. Accordingly, an effect of various embodiments of the invention is supported. On the other hand, in Comparative example 2, energy saving and stable operation cannot be carried out due to scaling of the surface of the heat exchanger.

A seawater desalination device and a seawater desalination method according to various embodiments and examples of the invention can be used for seawater desalination and salt extraction. Particularly, embodiments of the invention provide a seawater desalination device and a seawater desalination method capable of achieving a high-efficiency heat exchange operation through which a necessary energy for heat exchange, which is equivalent to a temperature difference, can be provided by a steam compressor only. Particularly, no heating operation is required because a necessary energy for heat exchange, which is equivalent to a temperature difference, can be provided by a steam compressor only.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. A seawater desalination device for seawater desalination, the device comprising:

a steam re-compressor configured to generate pressurized steam by pressurizing a steam evaporated from seawater, wherein the steam re-compressor is fluidly coupled downstream of a water-droplet separator and upstream of a steam supplier;

a first heat exchanger configured to exchange an amount of liquid sensible heat of the seawater to be desalinated with an amount of liquid sensible heat after the pressurized steam is condensed, and an amount of sensible heat of a concentrated liquid after the seawater is concentrated, wherein the first heat exchanger is fluidly coupled downstream of a seawater supplier and upstream of a second heat exchanger passing the seawater, fluidly coupled downstream of the second heat exchanger and upstream of a first discharger passing the concentrated liquid, and fluidly coupled downstream of the second heat exchanger and upstream of a second discharger passing the condensed pressurized steam;

the second heat exchanger configured to exchange an amount of heat of the pressurized steam, latent heat of vaporization of the seawater, and an amount of steam sensible heat when the seawater is evaporated, and further configured to concentrate the seawater, wherein the second heat exchanger is fluidly coupled downstream of the steam supplier receiving the pressurized steam, fluidly coupled downstream of the first heat exchanger receiving the seawater, and fluidly coupled upstream of the water-droplet separator passing the steam evaporated from the seawater;

the seawater supplier configured to supply the seawater to the first heat exchanger, and further to supply the seawater from the first heat exchanger to the second heat exchanger;

the steam supplier configured to supply steam evaporated from the seawater to the second heat exchanger;

the first discharger configured to discharge externally either of the concentrated seawater liquid after the seawater is concentrated or salt extracted from the seawater, or both of the concentrated seawater liquid and the salt;

the second discharger configured to discharge externally freshwater separated from the seawater; and the water-droplet separator configured to separate droplets of water mixed into the steam evaporated from the seawater and discharged from the second heat exchanger, wherein the water-droplet separator is fluidly coupled upstream of the second discharger passing water produced by the water-droplet separator directly to the second discharger, wherein the second heat exchanger is a fluidized bed, the fluidized bed comprising a moving medium including one of glass beads or deposition.

2. The seawater desalination device according to claim 1, wherein the steam re-compressor is further configured to re-compress the steam to increase an amount of heat.

3. The seawater desalination device according to claim 1, wherein all of the amount of heat necessary for seawater desalination is fully generated by the steam re-compressor.

4. The seawater desalination device according to claim 1, wherein the second heat exchanger comprises a heat transfer region for desalinating the seawater, the heat transfer region having an adjustable-formed heat transfer area.

5. The seawater desalination device according to claim 1, further comprising: a steam circulator, the steam circulator comprising a circulation line configured to circulate steam into a channel in the second heat exchanger.

6. A seawater desalination method for seawater desalination, the method comprising:

generating pressurized steam by pressurizing a steam evaporated from seawater;

exchanging, in a first heat-exchange step, an amount of a liquid sensible heat of the seawater to be desalinated with an amount of liquid sensible heat after the pressurized steam is condensed, and an amount of sensible heat of a concentrated liquid after the seawater is concentrated; and exchanging, in a second heat-exchange step, an amount of heat of the pressurized steam, an amount of latent heat of vaporization of the seawater, and an amount of steam sensible heat when the seawater is evaporated, and concentrating the seawater, the method further comprising:

supplying the seawater to the first heat-exchange step, and further supplying the seawater from the first heat-exchange step to the second heat-exchange step;

supplying steam evaporated from the seawater to the second heat-exchange step;

discharging, in a first discharge step, externally either of the concentrated seawater liquid after the seawater is concentrated or salt extracted from the seawater, or both of the concentrated seawater liquid and the salt;

discharging, in a second discharge step, externally freshwater separated from the seawater;

separating droplets of water mixed into the steam evaporated from the seawater and discharged from the second heat-exchange step; and introducing water produced in the separating step directly to the second discharge step, wherein the generating step, the steam is received from the steam produced in the separating step and the pressurized steam is passed to the steam supplying step, wherein the first heat-exchange step, the seawater is received from the seawater supplying step and is passed to the second heat-exchange step, the concentrated liquid is received from the second heat-exchange step and is passed to the first discharge step, and the condensed pressurized steam is received from the second heat-exchange step and is passed to the second discharge step, wherein the second heat-exchange step, the pressurized steam is received from the steam supplying step, the seawater is received from the first heat-exchange step, and the steam evaporated from the seawater is passed to the separating step, and wherein the second heat-exchange step utilizes a fluidized bed, the fluidized bed comprising a moving medium including one of glass beads or deposition.

7. The seawater desalination method according to claim 6, further comprising:

circulating steam into the second heat-exchange step.

8. A seawater desalination device for seawater desalination, the device comprising:

a steam re-compressor configured to generate pressurized steam by pressurizing a steam evaporated from seawater, wherein the steam re-compressor is fluidly coupled downstream of a water-droplet separation means and upstream of a steam supply means;

a first heat exchanger configured to exchange an amount of liquid sensible heat of the seawater to be desalinated with an amount of liquid sensible heat after the pressurized steam is condensed, and an amount of sensible heat of a concentrated liquid after the seawater is concentrated, wherein the first heat exchanger is fluidly coupled downstream of a seawater supply means and upstream of a second heat exchanger passing the seawater, fluidly coupled downstream of the second heat exchanger and upstream of a first discharging means passing the concentrated liquid, and fluidly coupled downstream of the second heat exchanger and upstream of a second discharging means passing the condensed pressurized steam;

the second heat exchanger configured to exchange an amount of heat of the pressurized steam, latent heat of vaporization of the seawater, and an amount of steam sensible heat when the seawater is evaporated, and further configured to concentrate the seawater, wherein the second heat exchanger is fluidly coupled downstream of the steam supply means receiving the pressurized steam, fluidly coupled downstream of the first heat exchanger receiving the seawater, and fluidly coupled upstream of the water-droplet separation means passing the steam evaporated from the seawater, and wherein the second heat exchanger is a fluidized bed, the fluidized bed comprising a moving medium including one of glass beads or deposition;

the seawater supply means for supplying the seawater to the first heat exchanger, and further for supplying the seawater from the first heat exchanger to the second heat exchanger;

the steam supply means for supplying steam evaporated from the seawater to the second heat exchanger;

the first discharging means for discharging externally either of the concentrated seawater liquid after the seawater is concentrated or salt extracted from the seawater, or both of the concentrated seawater liquid and the salt;

the second discharging means for discharging externally freshwater separated from the seawater; and the water-droplet separation means for separating droplets of water mixed into the steam evaporated from the seawater and discharged from the second heat exchanger, wherein the water-droplet separation means is fluidly coupled upstream of the second discharging means passing water produced by the water-droplet separation means directly to the second discharging means.

* * * * *